R. THOMPSON & C. EIRICH.
ATTACHMENT FOR CULTIVATORS.
APPLICATION FILED OCT. 2, 1913.

1,091,403.

Patented Mar. 24, 1914.

Witnesses
Geo. Ackman Jr.
J. F. Byrne

Inventors
Roy Thompson
Carl Eirich
By J. A. Irving
Attorney

UNITED STATES PATENT OFFICE.

ROY THOMPSON AND CARL EIRICH, OF OTRANTO STATION, IOWA.

ATTACHMENT FOR CULTIVATORS.

1,091,403.   Specification of Letters Patent.   Patented Mar. 24, 1914.

Application filed October 2, 1913.   Serial No. 793,032.

*To all whom it may concern:*

Be it known that we, ROY THOMPSON and CARL EIRICH, citizens of the United States of America, residing at Otranto Station, in the county of Mitchell and State of Iowa, have invented certain new and useful Improvements in Attachments for Cultivators, of which the following is a specification.

The invention relates to an improved attachment for cultivators, and particularly to a beet hiller designed for adjustable connection to the beam of the cultivator and adapted in operation to lift the leaves of the plant and maintain them elevated during the cultivating operation so that the beets may be properly hilled without covering the leaves.

The main object of the present invention is the provision of a beet hiller including a plurality of shields supported from the cultivator beam for vertical and lateral adjustment, the shields being designed to elevate the leaves of the beets and to act as a shield against the covering of said leaves during the cultivating operation.

The invention in the preferred form of details will be described in the following specification, reference being had particularly to the accompanying drawings, in which:—

Figure 1:
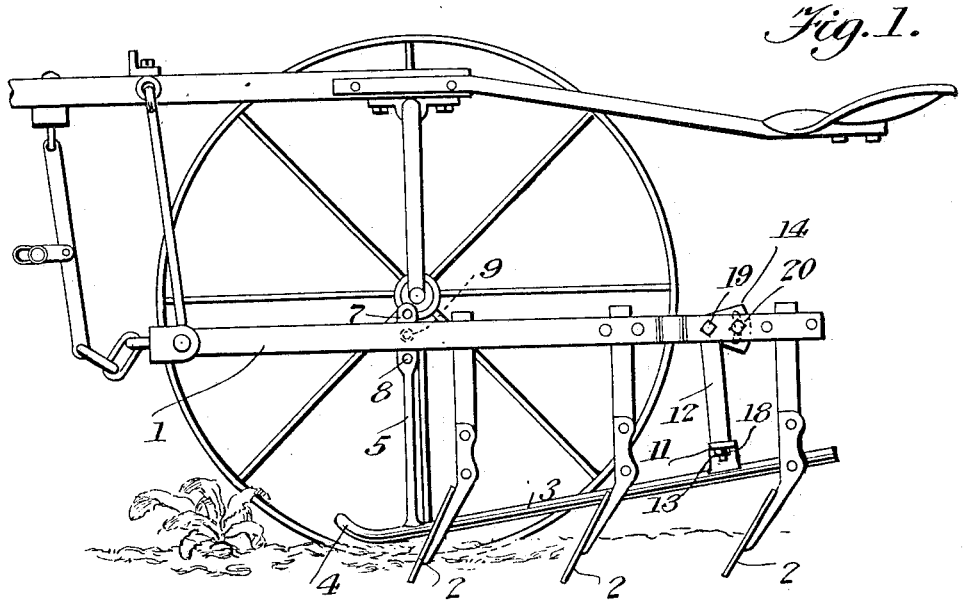
Figure 2:
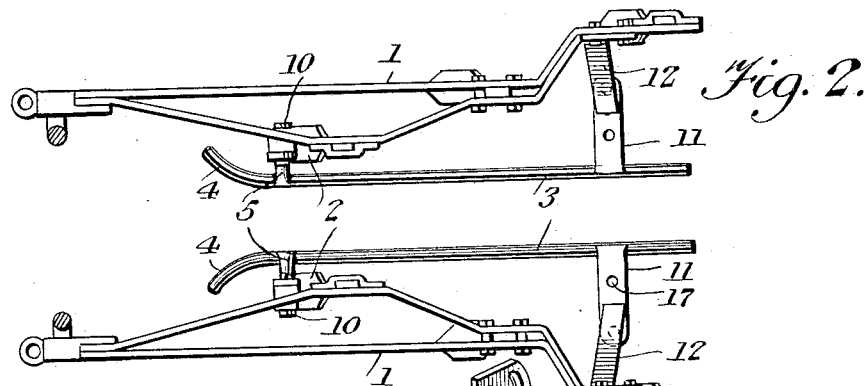
Figure 3:
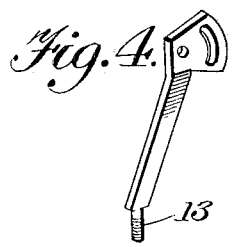
Figure 4:

Figure 1 is a broken elevation, partly in section, illustrating the application of the attachment. Fig. 2 is a plan of the same. Fig. 3 is a perspective view of the complete attachment removed. Fig. 4 is a perspective view of one of the rear hangers.

Referring particularly to the accompanying drawings, the improved attachment is shown as applied to what is known as a riding cultivator, which for the purposes of the present invention may be said to include the opposing beams 1 to each of which are secured in any usual or preferred manner the cultivating teeth 2.

The attachment comprises duplicate elongated round lifting rods 3, hereinafter termed shields, having their forward ends outturned as at 4. To each shield near its forward end is welded what we term the forward hanger 5, comprising a bar of appropriate length welded at 6 to the shield and extending upwardly and at a slight outward inclination with respect to the plane of the shield. The upper end of the bar is flattened and widened as at 7 and formed with a vertical series of openings 8, any one of which is designed to coöperate with an opening 9 in the beam 1 and to be removably secured to the beam by a bolt 10.

Secured to the rear end of each shield is an angle bracket 11, the horizontal portion of which extends outwardly at right angles to the plane of the shield and practically coincident with the upper edge thereof. In conjunction with the bracket the rear end of the shield is supported from the beam through the medium of a rear hanger 12 comprising a bar-like member terminating at its lower end in a threaded stud 13 and at its upper end in a plate extension 14 formed with a pivot opening 15, and with an arcuate slot 16 struck from the pivot opening as a center. The horizontal section of the bracket 11 is formed with a series of openings 17 in any one of which the stud 13 is adapted to fit, a nut 18 securing the hanger to the bracket. The upper end of the bracket is connected to the beam 1 by a bolt 19 passed through the beam and through the pivot opening 15 of the hanger, a clamping bolt 20 coöperating with the slot 16 and with an opening in the beam.

In applied position, the respective shields supported from the spaced beams of the cultivator extend in longitudinally spaced parallel relation between the respective rows of cultivating teeth, as clearly shown in Fig. 2 of the drawings. In the use of the attachment, the cultivator is operated so that the row of beets pass between the lifting rods, the outwardly curved ends 4 of the shield picking up the leaves of each plant and holding them elevated during the cultivating operation. The shields are of greater length than the distance between the front and rear teeth of the cultivator, so that the leaves of any particular plant are maintained elevated during the full cultivation and the dirt falling behind the shield will hill up the beet beneath the leaves.

By means of the forward hanger any desired elevation may be given the shield proper in order to adapt them for light or heavy cultivation, the rear hangers turning on their pivots during such adjustment and being clamped in position succeeding the proper adjustment. Furthermore, through the medium of the rear hangers the shields may be adjusted toward or from each other in order to compensate for the thickness of the leaves or to raise them to a greater or less degree during cultivation.

The attachment is readily adapted to any type of cultivator and in use will effectively insure the covering up or hilling of the beets during usual cultivating operation, and by such hilling dispense with the usual hand hoeing for such purpose.

What is claimed is:—

1. A beet hilling attachment for cultivators comprising duplicate lifting members, a hanger connected to the forward end of each lifting member, means for adjustably connecting said hanger to the cultivator beam, a hanger adjustably connected to the rear end of each shield, means for pivotally connecting said last mentioned hanger to the cultivator beam, and means for fixing said hanger in its pivotal adjustment on the beam.

2. A beet hilling attachment for cultivators comprising duplicate lifting members, a hanger connected at the lower end to the forward end of each lifting member, the upper end of said hanger being formed with a vertical series of openings for adjustable connection to the cultivator beam, a bracket secured to and extending laterally from the rear end of each lifting member, a rear hanger adapted for adjustable connection with the bracket, means for pivotally connecting the upper end of said rear hanger to the cultivator beam, and means for securing said rear hanger in desired pivotal adjustment.

In testimony whereof we affix our signatures in presence of two witnesses.

ROY THOMPSON.
CARL EIRICH.

Witnesses:
O. J. THOMPSON,
G. S. EPLEY.

Copies of this patent may be obtained for five cents each, by addressing the "Commissioner of Patents, Washington, D. C."